United States Patent
Kameda et al.

(10) Patent No.: US 8,722,781 B2
(45) Date of Patent: May 13, 2014

(54) RUBBER COMPOSITION FOR TIRE AND PNEUMATIC TIRE MADE THEREFROM

(75) Inventors: Yoshihiro Kameda, Hiratsuka (JP); Yasuhiro Yamada, Kyoto (JP); Satoru Yamakawa, Kyoto (JP); Tsuyoshi Okamoto, Kyoto (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 1170 days.

(21) Appl. No.: 11/569,916

(22) PCT Filed: May 27, 2005

(86) PCT No.: PCT/JP2005/010207
§ 371 (c)(1),
(2), (4) Date: Jul. 6, 2007

(87) PCT Pub. No.: WO2005/118705
PCT Pub. Date: Dec. 15, 2005

(65) Prior Publication Data
US 2008/0097023 A1 Apr. 24, 2008

(30) Foreign Application Priority Data
Jun. 1, 2004 (JP) .................. 2004-163501

(51) Int. Cl.
C08K 5/053 (2006.01)
C08K 5/10 (2006.01)
C08K 5/06 (2006.01)
C08K 3/34 (2006.01)
C08L 7/00 (2006.01)
C08L 19/00 (2006.01)

(52) U.S. Cl.
USPC ........... 524/386; 524/321; 524/339; 524/376; 524/571; 524/789; 524/925; 152/450

(58) Field of Classification Search
USPC .......... 152/450; 524/386, 321, 339, 376, 571, 524/789, 925
See application file for complete search history.

(56) References Cited

U.S. PATENT DOCUMENTS

| | | | |
|---|---|---|---|
| 3,287,330 A | 11/1966 | Burt et al. | |
| 4,645,788 A | 2/1987 | Okumoto et al. | |
| 6,476,154 B1 * | 11/2002 | Maly et al. | 525/332.6 |
| 6,620,875 B2 * | 9/2003 | Hong et al. | 524/492 |
| 6,806,303 B2 * | 10/2004 | Nohara et al. | 524/287 |
| 2002/0042462 A1 | 4/2002 | Nohara et al. | |

FOREIGN PATENT DOCUMENTS

| | | |
|---|---|---|
| CN | 1247877 A | 1/2003 |
| DE | 3544112 A1 | 6/1986 |
| JP | 61-145236 A | 7/1986 |
| JP | 01-292182 A | 11/1989 |
| JP | 6-93138 A | 4/1994 |
| JP | 06093138 A * | 4/1994 |
| JP | 06248116 A | 9/1994 |
| JP | 10273559 A | 10/1998 |
| JP | 2001-164051 A | 6/2001 |
| JP | 2003-82221 A | 3/2003 |
| JP | 2003-105140 A | 4/2003 |
| JP | 2005-501950 A | 1/2005 |
| WO | WO-03/020813 A1 | 3/2003 |

OTHER PUBLICATIONS

JP 06093138 A, Apr. 1994, Watanabe et al., Machine translation.*
Hanquing Li et al., Synthesis of tetrahydrofuran-ethylene oxide-propylene Oxide Copolyether Ployurethane Casting Rubber, Synthesized Rubber Industry: No. 3, 1979 (see line 1, p. 213—to line 7, p. 217).
Database WPI Week 200446, Thomsonscientific, London, GB; AN 2004-482748.

* cited by examiner

Primary Examiner — Satya Sastri
(74) Attorney, Agent, or Firm — Novak Druce Connolly Bove + Quigg LLP

(57) ABSTRACT

A rubber composition for a tire containing 100 parts by weight of a rubber, 1 to 30 parts by weight of a polyether (E1) having the formula (I):

$$R^1-\{(OCH_2CH_2CH_2CH_2)_m(OA)_n-OH\}_q \qquad (I)$$

wherein $R^1$ is a residue of a $C_1$ to $C_{24}$ compound having 1-6 hydroxyl groups, from which at least one hydroxyl group is removed, A Ls a $C_2$ to $C_{24}$ alkylene group other than a 1,4-butylene group, q is an integer of 1 to 6, and m and n are independently integers of 1 to 600, and/or the derivative thereof (E2) and 10 to 180 parts by weight of a filler, which is excellent in processability, silica dispersability abrasion resistance and wet braking performance, etc.

4 Claims, No Drawings

RUBBER COMPOSITION FOR TIRE AND PNEUMATIC TIRE MADE THEREFROM

CROSS-REFERENCE TO RELATED APPLICATIONS

This application is a National Stage of PCT/JP2005/010207 filed May 27, 2005 which in turn claims priority from Japanese Application 2004-163501, filed Jun. 1, 2004.

TECHNICAL FIELD

The present invention relates to a rubber composition for a tire and a pneumatic tire using the same.

BACKGROUND ART

It has long been known to use a filler such as carbon black and, silica for reinforcing rubber. When carbon black is used to reinforce rubber, a tire excellent in abrasion resistance can be produced. Silica, compared with carbon black, has a lower tan δ at a high temperature (around 60° C.), which is an indicator of the rolling resistance and has a high tan δ at a low temperature (around 0° C.), which is an indicator of the grip on wet roads, and therefore, for example, when used as a tire tread rubber composition, a tire having a low rolling resistance and a high grip can be produced (see, for example, Japanese Unexamined Patent Publication (Kokai) No. 10-273559 and Japanese Unexamined Patent Publication (Kokai) No. 6-248116).

DISCLOSURE OF THE INVENTION

However, it is difficult to mix a large amount of filler to a rubber and the mixing processability is poor, and therefore there is the problem that it is not possible to sufficiently secure the characteristics of a rubber composition such as abrasion resistance, low rolling resistance, and grip performance.

Accordingly, the objects of the present invention are to provide a rubber composition for a tire having a improved processability, abrasion resistance, rolling resistance and grip and a pneumatic tire.

In accordance with the present invention, there is provided a rubber composition for a tire comprising 100 parts by weight of a rubber, 1 to 30 parts by weight of a polyether (E1) having the formula (I):

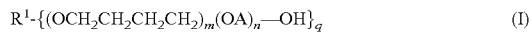

$$R^1\text{-}\{(OCH_2CH_2CH_2CH_2)_m(OA)_n\text{---}OH\}_q \qquad (I)$$

wherein $R^1$ is a residue of a $C_1$ to $C_{24}$ compound having 1 to 6 hydroxyl groups, from which at least one hydroxyl group is removed, A is a $C_2$ to $C_{24}$ alkylene group other than a 1,4-butylene group, q is an integer of 1 to 6, and m and n are independently integers of 1 to 600 and/or the derivative thereof (E2) and 10 to 180 parts by weight of a filler.

The rubber composition for a tire and the pneumatic tire according to the present invention has the characteristic features of excellent processability, abrasion resistance, rolling resistance and grip performance even when a large amount of a filler is compounded.

BEST MODE FOR CARRYING OUT THE INVENTION

The inventors engaged in intensive studies for achieving the above purpose and, as a result, found that a rubber composition in which a specific polyether chain-containing compounds are compounded, has an excellent processability, abrasion resistance, rolling resistance and grip performance whereby the present invention was completed.

That is, the present invention provides a rubber composition for a tire comprising 100 parts by weight of a rubber, into which 1 to 30 parts by weight of the polyether (E1) having the formula (I) and/or the derivative thereof (E2) and 10 to 180 parts by weight of a filler and a pneumatic tire using this rubber composition for the tread. Note that, in the formula (I), $R^1$ is a residue of a $C_1$ to $C_{24}$, preferably $C_1$ to $C_{20}$, compound having 1 to 6 (preferably 1 to 3) hydroxyl groups, from which at least one hydroxyl group is removed, A is a $C_2$ to $C_{24}$, preferably $C_2$ to $C_{16}$, alkylene group other than a 1,4-butylene group, q is an integer of 1 to 6, preferably 1 to 3 and m and n are independently integers of 1 to 600, preferably m is an integer of 3 to 100 and n is 5 to 150.

The rubber usable in the rubber composition for a tire according to the present invention may be any cross-linkable rubber component. Examples of such a cross-linkable rubber are, for example, natural rubber (NR), various types of butadiene rubber (BR), various types of styrene-butadiene copolymer rubber (SBR), polyisoprene rubber (IR), butyl rubber (IIR), halogenated butyl rubber, acrylonitrile butadiene rubber, chloroprene rubber, ethylene-propylene copolymer rubber, ethylene-propylene-diene terpolymer rubber, styrene-isoprene copolymer rubber, styrene-isoprene-butadiene copolymer rubber, isoprene-butadiene copolymer rubber, chlorosulfonated polyethylene, acryl rubber, epichlorohydrin rubber, polysulfide rubber, silicone rubber, fluorine rubber, urethane rubber, etc. These may be used alone or in any blends thereof. When the blend is used, the blend ratio is not particularly limited.

The polyether (E1) in the present invention is a compound shown in the above general formula (I). $R^1$ in the formula (I) is a residue of a $C_1$ to $C_{24}$ compound having 1 to 6 hydroxyl groups, from which at least one, preferably all, hydroxyl groups are removed. A residue of a linear or branched or alicyclic monovalent to hexavalent alcohol, a residue of a monovalent to hexavalent phenol, and a residue of a monovalent to hexavalent aromatic aliphatic alcohol may be mentioned. Illustrating these alcohols and phenols, the following (e1) to (e6) may be mentioned.

(e1) Monovalent Alcohol:

Linear or Branch $C_1$ to $C_{24}$ Aliphatic Saturated Monool:

Methanol, ethanol, propanol(e.g., n-propanol, isopropanol), butanol, pentanol, hexanol, heptanol, octanol(e.g., n-octanol, 2-ethylhexylalcohol), nonylalcohol, decyl alcohol, undecyl alcohol, dodecyl alcohol, tridecyl alcohol (e.g., n-tridecyl alcohol, isotridecyl alcohol), tetradecyl alcohol, pentadecyl alcohol, heptacdecyl alcohol, octadecyl alcohol, nonadecyl alcohol, eicosyl alcohol, heneicosyl alcohol, docosyl alcohol, tricosyl alcohol, tetracosyl alcohol, etc.

Linear or Branched $C_3$ to $C_{24}$ Aliphatic Unsaturated Monool (cis- or trans-):

Alkenyl alcohol (e.g., 1-, 2- and isopropenyl alcohol, butenyl alcohol, pentenyl alcohol, hexenyl alcohol, heptenyl alcohol, nonenyl alcohol, decenyl alcohol, undecenyl alcohol, dodecenyl alcohol, tridecenyl alcohol, tetracdecenyl alcohol, pentadecenyl alcohol, hexadecenyl alcohol, heptadecenyl alcohol, octadecenyl alcohol, nonadecenyl alcohol, eicosenyl alcohol, heneicosenyl alcohol, docosenyl alcohol, tricosenyl alcohol and tetracosenyl alcohol, etc.); and alkynyl alcohol (pentynyl alcohol, etc.)

$C_4$ to $C_{24}$ Alicyclic Monool:

Cyclopentanol, cyclohexanol, etc.

(e2) Bivalent Alcohol:

$C_2$ to $C_{24}$ Aliphatic Diol:

Alkylene glycol (e.g., ethylene glycol, propylene glycol, 1,3-, 1,4- and 1,2-butanediol, neopentyl glycol, 1,6-hexanediol, 1,2- and 1,8-octanediol, isobutylene glycol, 3-methyl-1,5-pentanediol, 2,2,4-trimethyl-1,3-pentanediol, 2,2-dimethyl-1,3-propanediol, 2-butyl-2-ethyl-1,3-propanediol, 2,5-dimethylhexane-2,5-diol, etc.)

$C_4$ to $C_{18}$ Alicyclic Diol:

Cycloalkylene glycols (e.g., 1,4-cyclohexanediol, 1,4-cyclohexanedimethanol, etc.) and hydrogenated bisphenols (e.g., hydrogenated bisphenol A, hydrogenated bisphenol F, etc.); and Heterocyclic Diol:

1,4,3,6-sorbitel, etc.

(e3) Trivalent to Hexavalent Alcohol:

$C_3$ to $C_{24}$ trivalent alkanetriol (e.g., glycerol, 1,2,3-butanetriol, 1,2,3-pentanetriol, 2-methyl-1,2,3-propanetriol, 2-methyl-2,3,4-butanetriol, 2-ethyl-1,2,3-butanetriol, 2,3,4-pentanetriol, 2,3,4-hexanetriol, 4-propyl-3,4,5-heptanetriol, 2,4-dimethyl-2,3,4-pentanetriol, pentamethylglycerol, 1,2,4-butanetriol, 1,2,4-pentanetriol, trimethylolethane, trimethylolpropane, etc.); $C_5$ to $C_{24}$ tetravalent to hexavalent alkanepolyols and their intramolecular or intermolecular dehydrates (e.g., pentaerythritol, dipentaerythritol, sorbitol, mannitol, 1,5-, 3,6- and 1,4-sorbitan, diglycerol, etc.); and saccharides and their derivatives (e.g., sucrose, glucose, mannose, fructose, methyl glycoside, etc.)

(e4) Monovalent Phenols:

$C_6$ to $C_{24}$ monovalent phenols [e.g., phenol, alkylphenol (e.g., o-, m- or p-methylphenol, m-, p-dimethylphenol, 2,6-dimethylphenol, o-, m- or p-ethylphenol, p-n-butylphenol, p-octylphenol, p-nonylphenol, etc.), monostearylphenol, monobenzylphenol, etc.]

(e5) Bivalent to Hexavalent Phenols:

$C_6$ to $C_{24}$ bivalent to hexavalent phenols [e.g., monocyclic polyhydric phenols {e.g., bivalent phenols (e.g., catechol, resorcine, hydroquinone, etc.), monocyclic trivalent to hexavalent phenol(e.g., trihydroxybenzene, tetrahydroxybenzene, hexahydroxybenzene, etc.)}, and bisphenols (bisphenol A, bisphenol F, etc.)

(e6) Monovalent to Hexavalent Aromatic Aliphatic Alcohols:

$C_7$ to $C_{24}$ aralkyl alcohols (e.g., benzyl alcohol, phenethyl alcohol, etc.); $C_8$ to $C_{24}$ substituted aralkyl alcohols (e.g., o-, m- or p-methylbenzyl alcohol and p-n-butylphenethyl alcohol etc.)

Preferable among these are (e1) to (e3), more preferably among these $C_1$ to $C_{20}$ ones, particularly preferably monovalent to trivalent alcohols, particularly preferably, from the viewpoint of the good solubility with hydrophobic thermoplastic resins, a $C_3$ to $C_{18}$ linear or branched aliphatic saturated or unsaturated monovalent alcohol. If there are less than 24 carbon atoms, the fluidity is good, and therefore, the mixing are processing ability is excellent.

The A in the formula (I) is a $C_2$ to $C_{24}$ alkylene group, except for 1,4-butylene group. For example, an ethylene group, 1,2- and 1,3-propylene group, 1,2- and 2,3-butylene group and isobutylene group, undecylene group, etc. may be mentioned. These may be used in any mixture of two or more types. The type of polymerization may be random or block, but, from the viewpoint of the excellent fluidity, it is preferable that the polymer has a random polymerized part. Preferably, among these, $C_2$ to $C_{16}$ alkylene groups, more preferably an ethylene group, 1,2-propylene group and 1,2-butylene group, particularly preferably, from the viewpoint of the kneadability/processability, a 1,2-propylene group and 1,2-butylene group are mentioned.

The m and n in the formula (I) is 1 to 600, preferably m is 3 to 100 and n is 5 to 150. Further, the preferable ratio (m/n) of m and n is 5/95 to 95/5.

In the polyether (E1), the —$(OCH_2CH_2CH_2CH_2)_m$— and —$(OA)_n$— may be randomly bonded or block bonded, but the presence of a randomly bonded part is preferable from the viewpoint of the fluidity at a low temperature. q is preferably 1 to 3, particularly preferably 1 from the viewpoint of good solubility with a hydrophobic rubber. If q is within 6, the fluidity characteristic is excellent.

The polyether (E1) in the present invention preferably has an HLB of 10 or less, more preferably 1 to 8, particularly preferably 2 to 6. If in this range, it is excellent in dispersability of the reinforcing filler.

The HLB value referred to in the present invention means the value calculated by the Oda method based on an organic conception diagram. The method of calculation is, for example, described in "Technique of Emulsification and Solubilization" (1976, Kogaku Tosho K.K.)]. Further, the organic value and inorganic value for obtaining the HLB value can be derived using the inorganic group table described in *Organic Conception Diagram—Fundamentals and Application-*, [1984, Sankyo Shuppan K.K.] (1974, Reported Value of Fujita et al.) The polyether (E1) has a weight average molecular weight (Mw) of, preferably, 500 to 30,000, more preferably 1,000 to 10,000, particularly preferably 1,500 to 6,000. If Mw is 500 or more, it is excellent in dispersability of the reinforcing filler, while if 30,000 or less, it is hard to increase the viscosity, which is good from the viewpoint of handling. Here, the "Mw" is the value measured by gel permeation chromatography (GPC) (column: TSKGel G2000, G3000, G4000HXL, solvent: tetrahydrofuran).

As the method for producing a polyether (E1), the method of addition bonding alone, randomly or in a block, to a $C_1$ to $C_{24}$ compound having 1 to 6 hydroxyl groups as represented by $R^1(OH)_q$ in the presence of a catalyst, preferably at a temperature of 30 to 120° C., preferably at a pressure of 0 to 0.6 MPa, for example, tetrahydrofuran (hereinafter referred to as "THF") and at least one $C_2$ to $C_{24}$ alkylene oxide (hereinafter referred to as "AO") may be mentioned. The polyether can be obtained by removing the catalyst, if necessary.

As the catalyst, a known catalyst may be used, but among AO's, in the case of an independent addition reaction of AO having a 4-member ring (e.g., oxetane) or 5-member ring (e.g., THF) or a copolymerization addition reaction with a 3-member ring (e.g., ethylene oxide, propylene oxide, etc.) and in an independent addition reaction of AO's having 3-member ring with each other, the range of the preferable catalyst differs.

As the catalyst in the case of an independent addition reaction of AO having a 4- or 5-member ring or copolymerization addition reaction between an AO having a 4- or 5-member ring and an AO having a 3-member ring, for example Lewis ackds such as $BF_3$, $BCl_3$, $AlCl_3$, $FeCl_3$ and $SnCl_3$ and their complexes [for example $BF_3$ ether complex, $BF_3$ tetrahydrofuran complex ($BF_3$-THF)]; protonic acids such as $H_2SO_4$, $HClO_4$; alkali metal perchlorates such as $KClO_4$, $NaClO_4$; alkali earth metal perchlorate such as $Ca(ClO_4)_2$, $MG(ClO_4)_2$; metal perchlorate, other than the above, such as $Al(ClO_4)_3$;, etc. may be mentioned. Preferable, among these, are a $BF_3$ ether complex and $BF_3$THF complex ($BF_3$-THF).

As the catalyst, in the case of an addition reaction of AO's having three-member rings, in addition to the above catalysts, an alkali catalyst, for example, hydroxides (e.g., alkali metal or alkali earth metal hydroxide such as KOH, NaOH, CsOH, $Ca(OH)_2$); oxides (e.g., alkali metal or alkali earth metal oxides such as $K_2O$, CaO, BaO); alkali metals (e.g., Na, K, etc.) and the hydrogenates thereof (e.g., NaH, KH, etc.); amines such as triethylamine, trimethylamine etc. may be mentioned. Preferable, among these, are KOH, NaOH, CsOH, a $BF_3$ ether complex and a $BF_3$THF complex (e.g., $BF_3$.THF).

As the added AO, those having the formula (I), where A is a $C_2$ to $C_{24}$ alkylene group, are exemplified. For example, ethylene oxide (hereinafter referred to as "EO"), propylene oxide (hereinafter referred to as "PO"), 1,2-butylene oxide, 2,3-butylene oxide, isobutylene oxide, undecylene oxide, etc. may be mentioned. Preferable, among these, are EO, PO, and 1,2-butylene oxide, particularly preferably PO and 1,2-butylene oxide. These may be used together. The form of polymerization may be random or block.

The addition mole number m of THF is 3 to 100, while the addition mole number n of AO is preferably 5 to 150. Further, the THF and the AO may be random added or block added, but random addition is preferable from the viewpoint of the excellent low temperature fluidity. In the THF addition, at least 80% by weight being random addition is more preferable.

As the polyether derivative (E2) in the present invention, an alkyl ether product (E21) or carboxylic acid esterified product (E22) of the polyether (E1), a reaction product (E23) of polyether (E1) and polyisocyanate, or a reaction product (E24) of polyether (E1) and polyhalide may be mentioned.

Preferable, among the alkyl ether products (E21) of polyether, are $C_1$ to $C_8$ alkyl ether products, for example, an ether product, preferably a methylether product, having a methyl group, ethyl group, n-propyl group, n-butyl group, n-hexyl group, n-octyl group, etc. may be mentioned.

The alkyl ether product (E21) may be produced by reaction of the polyether (E1) with a halogenated alkyl ($C_1$ to $C_8$) in the presence of an alkali (e.g., hydroxides of an alkali metal such as KOH, NaOH, CsOH, etc.) The amount of the halogenated alkyl is preferably, based upon the hydroxyl groups of the polyether (E1), by equivalent ratio, halogenated alkyl/hydroxyl groups=1/1 to 5/1, particularly 1.2/1 to 4/1. Further, the addition amount of alkali is preferably, with respect to the hydroxyl groups of the polyether (E1), by equivalent ratio, alkali/hydroxyl group=1/1 to 10/1, particularly preferably 1.2/1 to 5/1. The reaction may be performed, if necessary, using a solvent such as toluene, benzene. The etherization reaction may be carried out at an ordinary pressure or under pressure. The state of progress of the etherization reaction may be judged by the alkali value of the reaction system, viscosity, number average molecular weight of the reaction system, etc.

The esterified product of the carboxylic acid (E22) is an esterified product obtained by a reaction between the polyether (E1) and at least one esterification agent (a) selected from the group consisting of a $C_2$ to $C_{22}$ carboxylic acid, carboxylic acid anhydride, a $C_1$ to $C_4$ alkyl group-containing carboxylic acid alkyl ester and a $C_2$ to $C_{22}$ carboxylic acid halide.

As the esterification agent (a), the following may be mentioned.

(a1) $C_2$ to $C_{22}$ Aliphatic Monocarboxylic Acids:

Acetic acid, propionic acid, thiopropionic acid, butanoic acid, hexanoic acid, lauric acid, myristic acid, palmitic acid, oleic acid, etc.;

(a2) $C_2$ to $C_{22}$ Aliphatic Dicarboxylic Acids:

Oxalic acid, malonic acid, succinic acid, propanedicarboxylic acid, thiodipropionic acid, tetrahydrophthalic acid, methyl tetrahydrophthalic acid anhydride, hexahydrophthalic acid anhydride, hymic acid (i.e., 2-norbornene-2,3-dicarboxylic an hydride), tetrabromophthalic acid, tetrachlorophthalic acid, etc.

(a3) $C_3$ to $C_{22}$ Aliphatic Trivalent to Tetravalent or Higher Carboxylic Acid:

Propanetricarboxylic acid, methylcyclohexane tricarboxylic acid, cyclohexene tricarboxylic acid, methylcyclohexene tricarboxylic acid, cyclohexane tetracarboxylic acid, etc.

(a4) Aromatic Monocarboxylic Acid:

Benzoic acid, phenyl acetic acid, naphthalene carboxylic acid.

(a5) Aromatic Dicarboxylic Acid:

Phthalic acid, isophthalic acid, terephthalic acid, naphthalene dicarboxylic acid, xylylene dicarboxylic acid, etc.

(a6) Aromatic Trivalent to Tetravalent or Other Carboxylic Acid:

Benzene tricarboxylic acid, benzene tetracarboxylic acid, naphthalene tetracarboxylic acid, etc.

(a7) Acid Anhydride of the Above (a2), (a3), (a5) or (a6)

(a8) Lower Alkyl Ester of Above (a1) to (a6)

$C_1$ to $C_4$ alkyl ester such as, for example, methyl, ethyl, propyl, butyl ester.

(a9) Acid Halides of Above (a1) to (a6) (Chlorine, Bromine, etc.):

The esterification agent (a) may contain one to three, preferably one heteroatom (sulfur, phosphorus, etc.)

Preferable, among the esterification agents (a), are (a2), (a5), and (a7), more preferably oxalic acid (anhydride), malonic acid (anhydride), succinic acid (anhydride), propanedicarboxylic acid (anhydride), thiodipropionic: acid, tetrahydro-phthalic acid (anhydride), methyltetrahydrophthalic acid anhydride, hexahydrophthalic acid anhydride (anhydride), hymic acid(anhydride), norbornene dicarboxylic acid (anhydride), phthalic acid (anhydride), isophthalic acid, and terephthalic acid, particularly preferably oxalic acid (anhydride), malonic acid (anhydride), succinic acid (anhydride), propanedicarboxylic acid (anhydride) and thiodipropionic, acid. The polyether derivative (E2) using these has a low viscosity and is easy to handle.

The reaction conditions between the polyether (E1) and esterification agent (a) may be made the general esterification reaction conditions. For example, in the case of a single-stage synthesis method, an esterification catalyst, preferably an acid catalyst (for example, p-toluene sulfonic acid, sulfuric acid, etc.) may be used. The synthesis is performed preferably at 50 to 150° C., more preferably 70 to 130° C., for 8 to 20 hours. The equivalent ratio (E1)/(a) of the functional groups of the polyether (E1) and esterification agent (a) is preferably 0.5 to 2.0, more preferably 0.9 to 1.5. If the ratio is 0.5 or more, the unreacted (a) does not remain in a large amount and rinsing or other treatment becomes unnecessary, while if 2.0 or less, the polyether derivative (E2) is good in lubrication ability. Further, if necessary, for the reaction, a salvent such as toluene, benzene may be used. The esterification reaction may be carried out under an ordinary pressure, reduced pressure, or increased pressure, but reduced pressure is preferred, since the reaction time becomes shorter. The degree of reduced pressure is, in the final stage of the reaction, preferably 30 mmHg or less, particularly preferably 10 mmHg or less. The state of progress of the esterification reaction can be judged from the water distilled from the reaction system, the amount of the lower alcohol, the acid value of the reaction system, the viscosity, the number average molecular weight of the reaction system, etc.

As the polyisocyanate (b) usable in the reaction product (E23) of the polyether (E1) and the polyisocyanate, a bivalent to hexavalent or higher polyisocyanate can be used. Those used in the past for the production of polyurethane may be mentioned. Specifically, the following (b1) to (b4) may be mentioned.

(b1) Aromatic Polyisocyanate:

1,3- and/or 1,4-phenylenediisocyanate, 2,4- and/or 2,6-tolylenediisocyanate (TDI), crude TDI, 2,4'- and/or 4,4'-diphenylmethanediisocyanate (MDI), 4,4'-diisocyanatebiphenyl, 3,3'-dimethyl-4,4'-diisocyanatebiphenyl, 3,3'-dimethyl-4,4'-diisocyanatediphenylmethane, etc.

(b2) Aliphatic Polyisocyanate:

Ethylene diisocyanate, tetramethylene diisocyanate, hexamethylene diisocyanate (HDI), dodecamethylene diisocyanate, 2,2,4-trimethylhexamethylene diisocyanate, lysine diisocyanate, 2,6-diisocyanate methylcaproate, bis(2-isocyanate ethyl)fumarate, etc.

(b3) Alicyclic Polyisocyanate:

Isophoron diisocyanate (IPDI), dicyclohexylmethane-4,4'-diisocyanate (hydrogenated MDI), cyclohexylene diisocyanate, methylcyclohexylene diisocyanate (hydrogenated TDI), etc.

(b4) Aromatic Aliphatic Polyisocyanate:

m- and/or p-xylylene diisocyanate (XDI), α,α,α',α'-tetramethylxylylene diisocyante (TMXDI), etc.

Preferable, among these, are aromatic polyisocyanate (b1) and aliphatic polyisocyanate (b2), more preferably 1,3- and/or 1,4-phenylene diisocyanate, 2,4- and/or 2,6-tolylene diisocyanate (TDI), crude TDI, 2,4'- and/or 4,4'-diphenylmethane diisocyanate (MDI) ethylene diisocyanate, tetramethylene diisocyanate, and hexamethylene diisocyanate (HDI).

The reaction conditions of the polyether (E1) and polyisocyanate (b) may be the general urethanation reaction conditions. For example, a urethanation catalyst, preferably a transition metal catalyst (for example, dibutyltin dilaurate etc.) may be used, preferably 50 to 150° C., more preferably 70 to 130° C., for synthesis over 8 to 20 hours. The equivalent ratio (E1)/(b) of the functional groups of the polyether (E1) and polyisocyanate (b) is preferably 0.5 to 2.0, more preferably 0.9 to 1.5. If 0.5 to 2.0, the lubrication ability of the polyether derivative (E2) becomes good. Further, for the reaction, in accordance with need, toluene, xylene, dimethylformamide, butyl acetate, or another solvent may be used. The urethanation reaction may be performed under any ordinary pressure or pressure. The state of progress of the urethanation reaction may be judged from the content of isocyanate groups of the reaction system, viscosity, the number average molecular weight of the reaction system, etc.

As the polyhalide (c) usable in the reaction product (E24) of the polyether and polyhalide, a bivalent to tetravalent or higher $C_1$ to $C_5$ chloride or bromide may be mentioned, specifically (c1) and (c2) may be mentioned.

(c1) $C_1$ to $C_2$ Polyhalide:

Dichloromethane, dichloroethane, dibromomethane, dibromoethane, trichloroethylene, etc. (c2) $C_3$ or Higher Polyhalide:

1,3-dichloropropane, 1,3-trichloropropane, 1,2-dibromobutane, etc. Preferable, among the polyhalides (c), are the $C_1$ to $C_2$ polyhalides (c1). Particularly, a polyether derivative (E2) using a dichloromethane or dichloroethane becomes low in viscosity and easy to handle.

The reaction of the polyether (E1) and polyhalide (c) is carried out under the general esterification reaction conditions. For example, an alkali, preferably an inorganic alkali (for example, sodium hydroxide or potassium hydroxide), is added in an amount of 0.9 to 1.5 equivalents based upon the halogen and the system performed at preferably 50 to 150° C., more preferably 70 to 130° C., for 6 to 24 hours. The equivalent ratio (E1)/(c) of the functional groups of the polyether (E1) and polyhalide (c) is preferably 0.5 to 2.0, more preferably 0.9 to 1.5. If 0.5 to 2.0, the polyether derivative (E2) becomes excellent in lubrication ability. Further, a solvent such as toluene, benzene may be used for the reaction, if necessary. The esterification reaction may be carried out at any ordinary pressure and under pressure. The state of progress of the esterification reaction can be judged from the alkali value of the reaction system, the viscosity, the number average molecular weight of the reaction system, etc.

The weight ratio of the polyether (E1) and/or polyether derivative (E2) with respect to 100 parts by weight of said rubber ingredient is 1 to 30 parts by weight, preferably 2 to 15 parts by weight. If (E1) and/or (E2) is present in less than 1 part by weight, the rubber composition is poor in processability and cannot be sufficiently reinforced, and therefore, for example, the abrasion resistance etc. deteriorate. If more than 30 parts by weight, the rubber composition becomes too low in hardness, and, for example, the strength is decreased.

The rubber composition for a tire according to the present invention may use a known filler usable as a reinforcing filler for a synthetic or natural resin. As the filler, a metal oxide, metal hydroxide, metal carbonate, metal sulfate, metal silicate, metal nitride, carbon, or other filler may be mentioned.

As the metal oxide, for example, silica, diatomaceous earth, alumina, zinc oxide, titanium oxide, calcium oxide, magnesium oxide, iron oxide, tin oxide, antimony oxide, etc. may be mentioned.

As the metal hydroxide, for example, calcium hydroxide, magnesium hydroxide, aluminum hydroxide, basic magnesium carbonate, etc. may be mentioned.

As the metal carbonic acid salt, for example, calcium carbonate, magnesium carbonate, zinc carbonate, barium carbonate, dawsonite, hydrotalcite, etc. may be mentioned.

As metal sulfate, for example, calcium sulfate, barium sulfate, gypsum fiber, etc. may be mentioned.

As metal silicates, for example, calcium silicate, talc, kaolin, clay, mica, montmorillonite, bentonite, activated clay, sepiolite, imogolite, sericite, glass fiber, glass beads, silica-based balloons, etc. may be mentioned.

As the metal nitrides, for example, aluminum nitride, boron nitride, silicon nitride, etc. may be mentioned.

As the carbon, for example, carbon black, graphite, carbon fiber, carbon balloons, charcoal powder, fullerrene, etc. may be mentioned.

As other fillers, for example, various other metal powders (e.g., gold, silver, copper, tin, etc.), potassium titanate, lead zirconate titanate, aluminum borate, molybdenum sulfide, silicon carbide, stainless steel fiber, zinc borate, slag fiber, Teflon (Registered Trademark) powder, sawdust, pulp, rubber powder, aramide fiber, starch, etc. may be mentioned.

These fillers may be used alone or in combinations of two or more types. Preferable, among these fillers, are, from the viewpoint of the reinforcing ability such as the abrasion resistance carbon black and silica, more preferably silica.

The weight ratio of the reinforcing filler, based upon 100 parts by weight of the rubber component is 10 to 180 parts by weight, preferably 30 to 100 parts by weight. If the blended amount of the filler is smaller than 10 parts by weight, the rubber cannot be sufficiently reinforced, and therefore, for example, the abrasion resistance etc. are liable to deteriorate. Conversely, if more than 180 parts by weight, the hardness becomes too high and the processability is liable to decrease.

The shape of the filler is not particularly limited, but fibers, needles, plates, spheres, grains (i.e., irregular or not regular shape, same meaning below), tetrapots, balloons, etc. may be mentioned. Further, the filler, if necessary, may be treated on the surface thereof by a treatment agent. As the surface treatment agent, a known surface treatment agent can be used. For example, a silane coupling agent, titanate coupling agent, aluminate coupling agent, oil or fat, polyethylene glycol type anionic surfactant, polyhydric alcohol type anionic surfactant, wax, fatty acid, carboxylic acid coupling agent, phosphoric acid coupling agent, etc. may be mentioned.

As the silane coupling agent, for example, bis(3-triethoxysilylpropyl) tetrasulfide, bis(3-trimethoxysilylpropyl) tetrasulfide, bis(3-methyldimethoxysilylpropyl) tetrasulfide, bis (3-triethoxysilylethyl) tetrasulfide, bis(3-triethoxysilylpropyl) disulfide, bis(3-trimethoxysilyl-propyl) disulfide, bis(3-triethoxysilylpropyl) trisulfide, 3-mercaptopropyltrimethoxysilane, 3-mercaptopropyltriethoxysilane, vinyltriethoxy-silane, vinyltrimethoxysilane, 3-aminopropyl-triethoxysilane, 3-aminopropyltrimethoxysilane, 3-mercaptopropylmethyldimethoxysilane, γ-glycidoxypropyltri-methoxysilane, γ-glycidoxypropylmethyl-diethoxysilane, 3-trimethoxysilylpropyl-N,N-dimethylcarbamoyl-tetrasulfide, 3-trimethoxysilyl-propyl-benzothiazolyltetrasulfide, 3-trimethoxy-silyl-propylmethacryloylmonosulfide, γ-chloropropyltrimethoxysilane, vinyl tris(β-methoxyethoxy) silane, γ-methacryloxypropyl-trimethoxysilane and β-(3,4-epoxycyclohexyl) ethyltrimethoxysilane, etc. may be mentioned. These may be used alone or more.

As the titanate coupling agent, for example isopropyl triisostearoyl etc. may be mentioned. As the aluminate coupling agent, for example, acetoalkoxyaluminum diisopropylate etc. may be mentioned.

As the oil or fat, for example, an aromatic oil, paraffin oil, coconut oil, rice bran oil, soybean oil, linseed oil, hydrated castor oil, safflower oil, tung oil, etc. may be mentioned. As a polyethylene glycol type anionic surfactant, for example, a higher alcohol ethylene oxide adduct, fatty acid ethylene oxide adduct, higher alkylamine ethylene oxide adduct, polypropylene glycol ethylene oxide adduct, etc. may be mentioned. As a polyhydric alcohol type anionic surfactant, for example, polyethylene oxide, glycerin fatty acid ester, pentaerythritol fatty acid ester, sorbitol or sorbitan fatty acid ester, polyhydric alcohol alkyl ether, and alkanolamine aliphatic amide, etc. may be mentioned.

As the wax, for example, polypropylene maleate, polyethylene maleate, etc. may be mentioned. As the fatty acid, for example, stearic acid, oleic acid, linoleic acid, linolenic acid, eleostearic acid, etc. may be mentioned.

As the carboxylic acid coupling agent, for example, carboxylated polybutadiene, carboxylated polyisoprene, etc. may be mentioned. As the phosphoric acid coupling agent, for example, phosphoric acid-based coupling agents such as phosphoric acid monooctyl ester, phosphoric acid mono(2,6-dimethyl-7-octenyl) ester, phosphoric acid mono(6-mercaptohexyl) ester, phosphoric acid mono(2-methacryloxypropyl) ester, etc. may be mentioned.

The amount: of addition, when using the surface treatment agent, is, based upon 100 parts by weight of rubber, preferably 1 to 20 parts by weight, more preferably 2 to 10 parts by weight.

At the time of mixing of the additives, as the method of mixing, an ordinary known method can be used. In general, bulk, pellet or powder ingredients may be mixed using a suitable, for example, kneader, internal mixer, Banbury mixer, roll, etc., then press formed. Further, if necessary, any compounding agents usually used in the rubber industry, for example, a vulcanization accelerator (e.g., aldehyde-ammonia-amine-based, thiourea-based, guanidine-based, thiazole-based, sulfenamide-based, thiuram-based, dithiocarbamine acid salt-based, xantogen acid salt-based, dithiophosphoric acid salt-based, etc.), vulcanization agent (sulfur, etc.), anti-scorching agent (organic acid, N-nitroso compound, etc.), coloring agents, UV absorbents, general use plasticizers (e.g., phthalic acid-based, trimellitic acid-based, phosphoric acid-based, epoxy-based, etc.), softening agent, antioxidant, organic peroxide, etc. may be suitably added in the normal range of compounding amounts.

The order of addition of the ingredients at the time of mixing is not particularly limited. It is possible to mix the polyether (E1) and/or its derivative (E2) with the filler and then blend this into the rubber or simultaneously fix the polyether (E1) and/or its derivative (E2), filler, and rubber.

As the method for molding the rubber composition of the present invention, injection molding, compression molding, calendaring, slush molding, rotary molding, extrusion, blow molding, film formation (e.g., casting, tentering, inflation, etc.), vulcanization press molding, etc. may be mentioned. Any method may be used, based upon the use.

EXAMPLES

Examples will be used to further explain the present invention, but the present invention is by no means limited to these Examples. Note that the "parts" hereinbelow indicate "parts by weight".

The compounding agents used in the Examples etc. were as follows:

S-SBR: Bayer's solution polymerization SBR VSL5025 (oil extension 37.5 phr)

BR: Nippon Zeon's BR 1220

Filler (carbon black): Tokai Carbon's N234

Filler (silica): Rhodia's Z1165MP

Silane coupling agent: Degussa's bis-[3-(triethoxysilyl)-propyl]tetrasulfide (i.e., Si69)

Zinc white: Seido Chemical (Zinc White No. 3)

Stearic acid: NOF Corporation's Beads Stearic Acid

Antioxidant 6C: Flexsys' N-phenyl-N'-(1,3-dimethylbutyl)-p-phenylenediamine (SANTOFLEX 6PPD)

Process oil: Fuji Kosan's Aromatics 3

Sulfur: Hosoi Chemical Industrial's oil-extended sulfur

Vulcanization accelerator CZ: N-cyclohexyl-2-benzothiazyl sulfenamide (Noccelar CZ-G) made by Ouchi Shinko Chemical Industrial Vulcanization accelerator DPG: Ouchi Shinko Chemical Industrial diphenyl guanidine (Noccelar D)

Polyether E1: THF14.3 mole/E020.4 mole random adduct of 1,4-butanediol synthesized in the following Synthesis Example 1

Synthesis Example 1

A glass autoclave was charged with 90 parts of 1,4-butanediol (1.0 mole), 1032 parts of THF (14.3 moles), and 12.8 parts of $BF_3$-THF and 896 parts of EO (20.4 moles) was dropwise added from a pressure resistant dropping funnel at 35 to 50° C. over 10 hours. Thereafter, the resultant mixture was reacted at 50° C. over 5 hours, followed by cooling. Further, 7.4 parts of a 48% aqueous NaOH solution was added, then the unreacted substance was distilled off at 30 mmHg or less. Thereafter, an adsorption treatment agent (Kyowa Chemical Industry Kyoward 600 and Kyoward 1000, the same below) was used for treatment, then the resultant mixture was filtered, then dehydrated under reduced pressure (i.e., 130° C., 30 mmHg or less, 1 hour, the same below) to obtain 2000 parts of a THF14.3 mole/EO20.4 mole random addition product of 1,4-butanediol (polyether E1).

Polyether E2: THF6.5 mole/PO10.0 mole random addition product of lauryl alcohol synthesized in the following Synthesis Example 2

Synthesis Example 2

A glass autoclave was charged with 186 parts of lauryl alcohol (1.0 mole), 468 parts of tetrahydrofuran (THF) (6.5 moles) and 7.9 parts of $BF_3$-THF and 580 parts (10.0 moles) of PO was dropwise added from a pressure resistant dropping funnel at 35 to 50° C. over 10 hours. Thereafter, the resultant mixture was reacted at 50° C. over 5 hours, followed by cooling. Further, 4.8 parts of a 48% aqueous NaOH solution was added, then an adsorption treatment agent was used for treatment, and the resultant mixture was filtered and dehydrated under a reduced vacuum at 130° C. and 30 mmHg or less to obtain 1230 parts of a THF6.5 mole/PO10.0 mole random addition product of lauryl alcohol (polyether E2).

Polyether E3: Ester obtained from the polyether E2 synthesized in the following Synthesis Example 3 and succinic acid

Synthesis Example 3

1234 parts of the (polyether E2) obtained in the Synthesis Example 2 (1.0 mole), 59 parts of succinic acid (0.5 mole), 4.8 parts of paratoluene sulfonic acid 1-hydrate and 3.2 parts of hypophosphoric acid were charged and reacted (esterified) over 12 hours at 100 to 120° C., while passing nitrogen through the solution and removing the water generated in the reaction. The resultant mixture was treated with an adsorption treatment agent and filtered to remove the paratoluene sulfonic acid 1-hydrate and hypophosphoric acid, then dehydrated under reduced pressure to obtain 1100 parts of a polyether compound (polyether E3) liquid in state at room temperature and with an acid value (measured according to JIS K 1557) of 3.0.

Polyether E4: EO19.0 mole adduct of lauryl alcohol synthesized in the following Synthesis Example 4

Synthesis Example 4

A glass autoclave was charged with lauryl alcohol in an amount of 186 parts (1.0 mole) and KOH 3.3 parts. 836 parts of EO (19.0 moles) were dropwise added at 105° C. over 33 hours from a pressure resistant dropping funnel. Thereafter, the ingredients were reacted at 130° C. for 10 hours, followed by cooling. Further, the resultant mixture was treated with an adsorption treatment agent, filtered, then dehydrated under reduced pressure at 130° C. and 30 mmHg or less to obtain 1000 parts of an EO19.0 mole addition adduct of lauryl alcohol (polyether E4).

Polyether E5: Sanyo Chemical Industriies Polypropylene Glycol "Newpol PP-2000"

Polyether E6: Sanyo Chemical Industrial Polyethylene Glycol "PEG-4000S"

The unvulcanized master batch obtained in the following Examples, tire tread rubber composition and size P205/60R15 pneumatic tire formed using the same for the tread were evaluated for physical properties.

(1) Mooney viscosity: An unvulcanized master batch was used to measure the Mooney viscosity at 100° C., according to JIS K 6300 and evaluated for kneadability/processability. The value of the Mooney viscosity is shown indexed to the value of the standard example as 100. The smaller the value, the better the mixing/processing ability.

(2) ΔG': A α-Technology RPA2000 was used to measure the strain shear stress G'. The unvulcanized rubber was used for vulcanization at 160° C. for 20 minutes and measured for G' at a strain of 0.28% to 30.0%. The difference (G' 0.28 (MPa)-G' 30.0 (MPa)) was shown as an index. The smaller the value, the better the silica dispersion.

(3) Wet braking performance: Each tire was run over an asphalt road surface sprinkled with water at an initial speed of 40 km/h, then the vehicle braked. The braking distance at this time was measured and indexed to the Standard Example as 100. The larger the value, the better the brakeability shown.

(4) Rolling resistance: The value of the rolling resistance at a vehicle speed of 80 km/h was measured and indexed to the Standard Example as 100. The smaller the value, the lower the value of the rolling resistance shown.

(5) Abrasion resistance: Each tire was run over a dry road surface for 10000 km under conditions of a load corresponding to 88% of the maximum load capacity defined in JATMA (YEAR BOOK 1998) and an air pressure of 200 kPa, then the abrasion of each tire was indexed to the abrasion of the Standard Example. The larger the value, the better the abrasion resistance shown.

Standard Example, Examples 1 to 3, and Comparative Examples 1 to 3

The ingredients other than the vulcanization system in each of the formulations shown in Table I were mixed by a 1.8 liter internal mixer for 3 to 5 minutes. When the content reached 165±5° C., the mixture was discharged. This mixture, i.e., the master batch was then mixed with the vulcanization accelerator and sulfur by an 8-inch open roll to obtain a rubber composition. This composition was used to evaluate the Mooney viscosity and ΔG'. On the other hand, this rubber composition was used as the tread to prepare a size P205/60R15 tire by an ordinary method which was then evaluated by its mixing/processing ability and physical properties. The results are shown in Table 1.

TABLE I

| | Standard Example | Example 1 | Example 2 | Example 3 | Comparative Example 1 | Comparative Example 2 | Comparative Example 3 |
|---|---|---|---|---|---|---|---|
| Formulation (parts by weight) | | | | | | | |
| S-SBR | 96.25 | 96.25 | 96.25 | 96.25 | 96.25 | 96.25 | 96.25 |
| BR | 30.00 | 30.00 | 30.00 | 30.00 | 30.00 | 30.00 | 30.00 |
| Carbon black | 10 | 10 | 10 | 10 | 10 | 10 | 10 |
| Silica | 70 | 70 | 70 | 70 | 70 | 70 | 70 |
| Silane coupling agent | 5.6 | 5.6 | 5.6 | 5.6 | 5.6 | 5.6 | 5.6 |
| Zinc white | 3 | 3 | 3 | 3 | 3 | 3 | 3 |
| Stearic acid | 2.5 | 2.5 | 2.5 | 2.5 | 2.5 | 2.5 | 2.5 |
| Antioxidant 6C | 2 | 2 | 2 | 2 | 2 | 2 | 2 |
| Process oil | 10 | 10 | 10 | 10 | 10 | 10 | 10 |
| Sulfur | 1.5 | 1.5 | 1.5 | 1.5 | 1.5 | 1.5 | 1.5 |
| Vulcanization accelerator CZ | 1.7 | 1.7 | 1.7 | 1.7 | 1.7 | 1.7 | 1.7 |
| Vulcanization accelerator DPG | 1 | 1 | 1 | 1 | 1 | 1 | 1 |
| Polyether E1 | — | 5 | — | — | — | — | — |
| Polyether E2 | — | — | 5 | — | — | — | — |
| Polyether E3 | — | — | — | 5 | — | — | — |
| Polyether E4 | — | — | — | — | 5 | — | — |
| Polyether E5 | — | — | — | — | — | 5 | — |
| Polyether E6 | — | — | — | — | — | — | 5 |
| Rubber physical properties (index) | | | | | | | |
| Mooney viscosity | 100 | 93 | 90 | 88 | 98 | 95 | 93 |
| ΔG' | 100 | 74 | 77 | 75 | 95 | 97 | 96 |
| Tire performance (index) | | | | | | | |
| Wet braking performance | 100 | 107 | 106 | 106 | 102 | 101 | 102 |
| Rolling resistance | 100 | 85 | 88 | 86 | 98 | 98 | 100 |
| Abrasion resistance | 100 | 105 | 105 | 104 | 98 | 97 | 96 |

Industrial Applicability

The rubber composition for a tire and the pneumatic tire according to the present invention is superior in processability, economy (i.e., low rolling resistance) and safety (i.e., high grip), and therefore, can be used for automobile tires etc.

The invention claimed is:

1. A pneumatic tire using, as a tread thereof, a rubber composition comprising:
(1) 100 parts by weight of a rubber selected from the group consisting of natural rubber, butadiene rubbers, styrene-butadiene rubbers, and polyisoprene,
(2) 1 to 30 parts by weight of
(a) a polyether (E1) having the formula (I):

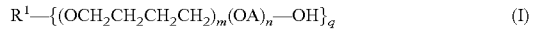

$$R^1-\{(OCH_2CH_2CH_2CH_2)_m(OA)_n-OH\}_q \quad (I)$$

wherein $R^1$ is a residue of a $C_1$ to $C_{24}$ compound having 1 to 6 hydroxyl groups, from which at least one hydroxyl group is removed, A is a $C_2$ to $C_{24}$ alkylene group other than a 1,4-butylene group, q is an integer of 1 to 6 and m and n are independently integers of 1 to 600 and having an HLB of 10 or less and a weight average molecular weight of 500 to 30,000, and/or
(b) the derivative thereof (E2), which is an alkyletherized product or linear aliphatic carboxylic acid esterified product of said polyether (E1) or
(c) a reaction product of polyether (E1) and a polyisocyanate or polyhalide; wherein said esterified product is an esterified product obtained from a reaction of the polyether (E1) with at least one compound selected from the group consisting of a $C_2$ to $C_{22}$ linear aliphatic carboxylic acid, $C_2$ to $C_{22}$ linear aliphatic carboxylic acid anhydride, a carboxylic acid linear alkyl ester having a $C_1$ to $C_4$ linear alkyl group, and a $C_2$ to $C_{22}$ carboxylic acid halide,
(3) 30 to 100 parts by weight of a filler including silica; and
(4) a vulcanization accelerator selected from the group consisting of aldehyde-ammonia-amine-based, thiourea-based, guanidine-based, thiazole-based, sulfenamide-based, dithiocarbamine acid salt-based, xaritogen acid salt-based, and dithiophosphoric acid salt-based vulcanization accelerators.

2. The pneumatic tire according to claim 1, wherein said component (2) is selected from the group consisting of THF/EO random adducts of 1,4-butanediol (E1), THF/PO random addition products of lauryl alcohol (E2) and esters derived from the polyether E2.

3. The pneumatic tire according to claim 2, wherein said filler further includes carbon black.

4. The pneumatic tire according to claim 1, wherein said filler further includes carbon black.

* * * * *